United States Patent
Guidotti et al.

(10) Patent No.: US 10,759,882 B2
(45) Date of Patent: Sep. 1, 2020

(54) CATALYST COMPONENTS FOR THE POLYMERIZATION OF OLEFINS

(71) Applicant: BASELL POLIOLEFINE ITALIA S.R.L., Milan (IT)

(72) Inventors: Simona Guidotti, Ferrara (IT); Tiziano Dall'Occo, Ferrara (IT); Dario Liguori, Ferrara (IT); Giampiero Morini, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 16/337,779

(22) PCT Filed: Sep. 25, 2017

(86) PCT No.: PCT/EP2017/074180
§ 371 (c)(1),
(2) Date: Mar. 28, 2019

(87) PCT Pub. No.: WO2018/060116
PCT Pub. Date: Apr. 5, 2018

(65) Prior Publication Data
US 2019/0248930 A1    Aug. 15, 2019

(30) Foreign Application Priority Data
Sep. 30, 2016  (EP) ..................... 16191815

(51) Int. Cl.
*C08F 10/02* (2006.01)
*C08F 210/16* (2006.01)

(52) U.S. Cl.
CPC ............ *C08F 10/02* (2013.01); *C08F 210/16* (2013.01); *C08F 2410/01* (2013.01)

(58) Field of Classification Search
CPC ....................................................... C08F 10/02
See application file for complete search history.

(56) References Cited

U.S. PATENT DOCUMENTS

| 4,305,840 A | 12/1981 | Zucchini et al. |
| 4,427,573 A | 1/1984 | Miles et al. |
| 2013/0244863 A1 | 9/2013 | Xu |

FOREIGN PATENT DOCUMENTS

| WO | 01/032718 A1 | 5/2001 |
| WO | 02/053604 A1 | 7/2002 |
| WO | 03/106511 A1 | 12/2003 |

OTHER PUBLICATIONS

International Search Report and Written Opinion dated Jan. 25, 2018 (dated Jan. 25, 2018) for Corresponding PCT/EP2017/074180.

*Primary Examiner* — Catherine S Branch

(57) ABSTRACT

A process for the preparation of a solid catalyst component for the homo or copolymerization of olefins, wherein the solid catalyst component is made from or contains Mg, Ti, halogen and an electron donor selected from cycloalkyl ethers, wherein the process includes the steps of (a) dissolving a Mg based compound and a $TiCl_3$ based compound in a liquid medium further made from or containing a cycloalkyl ether and a compound of formula $R^2OH$ where $R^2$ is a $C_1$-$C_{20}$ hydrocarbon group, in which the Ti/Mg molar ratio ranges from 0.1 to 0.5, the cycloalkyl ether/Mg ratio ranges from 1 to 4 and the ROH/Mg molar ratio ranges from 1 to 4; and (b) adding, to the solution coming from step (a), $SiCl_4$ in an amount such that the $R^2OH/SiCl_4$ molar ratio ranges from 0.5 to 1.5 and maintaining the temperature in the range 50-150° C. thereby precipitating the solid catalyst component particles.

15 Claims, No Drawings

CATALYST COMPONENTS FOR THE POLYMERIZATION OF OLEFINS

This application is the U.S. National Phase of PCT International Application PCT/EP2017/074180, filed Sep. 25, 2017, claiming benefit of priority to European Patent Application No. 16191815.6, filed Sep. 30, 2016, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a process for the preparation of catalyst components for the homo or copolymerization of olefins, wherein the catalyst components are made from or contain Mg, Ti and halogen elements and an electron donor compound selected from cycloalkyl ethers.

BACKGROUND OF THE INVENTION

Linear low-density polyethylene (LLDPE) is made from or contains ethylene/α-olefin copolymers containing an amount of α-olefin deriving units for yielding a density in the range 0.88-0.925. These copolymers are useful in the field of wrapping and packaging of goods, including stretchable films. In some instances, LLDPE is produced with liquid phase processes (solution or slurry) or gas-phase processes. Both types of processes involve the use of Ziegler-Natta $MgCl_2$-supported catalysts. In some instances, the catalysts are formed by the reaction of a solid catalyst component, in which a titanium compound is supported on a magnesium halide, with an activator such as an alkylaluminum compound.

It is believed that having a comonomer randomly or alternatively distributed along the polymer chain and, at the same time, having the polymer fractions with a similar average content of comonomer (narrow distribution of composition) may provide high quality ethylene copolymers. These latter can combine, at the same time, a density low with respect to HDPE and a low content of polymer fractions soluble in hydrocarbon solvents like hexane or xylene that may worsen certain properties of the resulting copolymers.

In some instances, certain Ziegler-Natta heterogeneous catalysts are based on Ti compounds supported on magnesium chloride further containing a certain amount of cycloalkyl ether as internal electron donor. In some instances, the cycloalkyl ether is tetrahydrofuran (THF).

SUMMARY OF THE INVENTION

The present disclosure provides a process for the preparation of a solid catalyst component for the homo or copolymerization of olefins $CH_2$=CHR, wherein R is hydrogen or a hydrocarbyl radical with 1-12 carbon atoms, wherein the solid catalyst component is made from or contains Mg, Ti, halogen and an electron donor selected from cycloalkyl ethers, the process includes the steps of:

(a) dissolving, at a temperature, a composition made from or containing a Mg based compound of formula ($MgCl_m X_{2-m}$) wherein m ranges from 0 to 2, X is, independently $R^1$, $OR^1$, —$OCOR^1$ or O—C(O)—$OR^1$ group, wherein $R^1$ is a $C_1$-$C_{20}$ hydrocarbon group, and a $TiCl_3$ based compound in a liquid medium further made from or containing a cycloalkyl ether and a compound of formula $R^2OH$ wherein $R^2$ is a $C_1$-$C_{20}$ hydrocarbon group, wherein the Ti/Mg molar ratio ranges from 0.1 to 0.5, the cycloalkyl ether/Mg ratio ranges from 1 to 4 and the $R^2OH$/Mg molar ratio ranges from 1 to 4, thereby yielding a solution;

(b) adding, to the solution coming from step (a), $SiCl_4$ in an amount such that the $R^2OH$/$SiCl_4$ molar ratio ranges from 0.5 to 1.5 and maintaining the temperature in the range 50-150° C., thereby precipitating the solid catalyst component particles.

DETAILED DESCRIPTION OF THE INVENTION

In some embodiments, the magnesium based compound is $MgCl_2$. In some embodiments, the compound is used as such. In alternative embodiments, the magnesium-based compound is milled to reduce the particle size, thereby favoring dissolution of the magnesium-based compound.

In some embodiments, the $TiCl_3$ based compounds catalyze the polymerization reaction. In some embodiments, the $TiCl_3$ is obtained by one of the following methods:

(a) reduction of $TiCl_4$ with hydrogen, at temperatures higher than 600° C.;
(b) reduction of $TiCl_4$ with Al;
(c) reduction of $TiCl_4$ with organometallic compounds of Al, or
(d) reduction of $TiCl_4$ with other metal such as Mg or Zn.

In some embodiments, complexes having composition $TiCl_3 \cdot 1/3 AlCl_3$ are obtained by reducing $TiCl_4$ with aluminum metal.

In some embodiments, the magnesium and titanium compounds are dispersed in liquid medium. In some embodiments, the liquid medium is a hydrocarbon medium which is inert to the above mentioned compounds. In some embodiments, the medium is selected among aliphatic or aromatic hydrocarbons that are liquid at room temperature and atmospheric pressure. In some embodiments, the liquid medium is selected from the group consisting of hexane, heptane, decane, benzene, toluene, and isomers thereof. In some embodiments, the liquid medium is toluene.

As mentioned, the liquid medium also contains a cycloalkyl ether and an alcohol of formula $R^2OH$. In some embodiments, the cycloalkyl ether is selected among cyclic ethers having 3-5 carbon atoms such as tetrahydrofuran, dioxane, or methyltetrahydrofuran. In some embodiments, the cycloalkyl ether is tetrahydrofuran. In some embodiments, the alcohol $R^2OH$ has $R^2$ selected among $C_3$-$C_{15}$ alkyl groups, alternatively $C_4$-$C_{10}$ alkyl groups. In some embodiments, the alcohol $R^2OH$ is selected from the group consisting of butanol, pentanol, hexanol, heptanol, octanol and isomers thereof. In some embodiments, the alcohol $R^2OH$ is selected from the group consisting of n-butanol, 1-octanol and 2-Me-1-pentanol.

In some embodiments, the cycloalkyl ether/Mg molar ratio ranges from 1.5 to 3.0. In some embodiments, the Ti/Mg molar ratio ranges from 0.15 to 0.35, alternatively from 0.15 to 0.3.

In some embodiments and in addition to the Mg based compound and $TiCl_3$ based compound, an additional compound is added and selected from compounds of elements of the Lantanides series or transition metal belonging to groups 3-12 of the Periodic Table, excluding Ti. In some embodiments, the additional compound is a halide, alcoholated, or a carboxylate. In some embodiments, the additional compound is a chloride.

In some embodiments, the compound is added to the mixture in amount such that its molar ratio with Mg ranges from 0.01 to 0.40, alternatively from 0.05 to 0.20.

In some embodiments, the additional compound is selected from the group consisting of chlorides of Cu, Zn, Pr, and Nb. In some embodiments, the additional compound is selected from the group consisting of $CuCl_2$ and $ZnCl_2$.

In some embodiments, the dissolution step takes place under stirring. In some embodiments, the dissolution step takes place at a temperature ranging from 25 to 150° C. In some embodiments, the temperature affects the dissolution time. In some embodiments, the dissolution time is dependent on other factors. In some embodiments, increasing the temperature reduces the time for the dissolution. In some embodiments, the temperature is maintained in the range 50-120° C. In some embodiments, the dissolution time ranges from 2 to 7 hours. In some embodiments, step (b) is started once a clear solution is obtained. In some embodiments, step (b) is started when the dissolution is not totally completed. In some embodiments with incomplete dissolution, the solids from the mixture are removed before starting step (b).

Step (b) is carried out by controlled addition of $SiCl_4$ to the solution obtained in step (a). In some embodiments, $SiCl_4$ is added in an amount such that the $R^2OH/SiCl_4$ molar ratio ranges from 0.6 to 1.3, alternatively, from 0.8 to 1.2, alternatively from 0.9 to 1.1.

In some embodiments, $SiCl_4$ is added dropwise, pure or diluted in the hydrocarbon used as liquid medium of step (a) while maintaining the mixture under stirring. In some embodiments, $SiCl_4$ is added diluted in the hydrocarbon used as liquid medium of step (a). In some embodiments, the temperature is maintained in the range 60-130° C., alternatively in the range 70-100° C. When the amount of $SiCl_4$ reaches a certain amount, solid particles start to precipitate even if the addition of $SiCl_4$ is not complete. The time to complete precipitation varies. In some embodiments, the reaction at $R^2OH/SiCl_4$ molar ratio of about 1 under a temperature in the range 80-90° C. completes in from 2 to 5 hours.

In some embodiments, when step (b) is carried out at a relatively low temperature, that is, in the range 60-75° C., a post reaction step involves raising the temperature to 80-100° C. for a time ranging from 2 to 4 hours.

In some embodiments, the precipitated particles constituting the solid catalyst component are collected by siphoning, filtration, centrifugation, or thermal removal of the solvent. In some embodiments, the precipitated particles are collected by filtration, then washed with hydrocarbon solvents and dried. In some embodiments, the solid catalyst component average particle size varies from 10 to 100 μm. In some embodiments, the solid catalyst component average particle size is regulated by varying the intensity of mixing.

In some embodiments, the solid catalyst component is converted into catalyst for the polymerization of olefins by reacting the solid catalyst component with alkyl-Al compounds.

In some embodiments, the alkyl-Al compound is chosen among trialkyl aluminum compounds. In some embodiments, the trialkyl aluminum compound is selected from the group consisting of triethylaluminum, triisobutylaluminum, tri-n-butylaluminum, tri-n-hexylaluminum, and tri-n-octylaluminum. In some embodiments, the alkyl-Al compound is selected from the group consisting of alkylaluminum halides, alkylaluminum hydrides alkylaluminum sesquichlorides, and mixtures thereof with trialkylaluminums. In some embodiments, the alkyl-Al compound is selected from the group consisting of $AlEt_2Cl$ (diethyl aluminum chloride) and $Al_2Et_3Cl_3$. In some embodiments, the alkyl-Al compound is a mixture of aluminum triethyl and diethylaluminum chloride.

In some embodiments, the Al/Ti ratio is higher than 1, alternatively between 50 and 2000.

In some embodiments, an external electron-donor (ED) compound(s) is used. In some embodiments, the external electron-donor (ED) compound is selected from silicon compounds, ethers, esters, amines, heterocyclic compounds, and ketones. In some embodiments, the external electron-donor (ED) compound is 2,2,6,6-tetramethylpiperidine.

In some embodiments, the catalyst is used in a process for the polymerization or copolymerization of olefins $CH_2=CHR$, in which R is hydrogen or a hydrocarbyl radical with 1-12 carbon atoms.

In some embodiments, the catalysts are used to prepare ethylene polymers in very high yields.

In some embodiments, the catalyst are used to prepare very-low-density and ultra-low-density polyethylene (VLDPE and ULDPE, having densities lower than 0.920 $g/cm^3$, including values down to 0.880 $g/cm^3$) consisting of copolymers of ethylene with one or more alpha-olefins having from 3 to 12 carbon atoms, having a mole content of units derived from ethylene of higher than 80%; and high density ethylene polymers (HDPE, having a density higher than 0.940 $g/cm^3$), made from or containing ethylene homopolymers and copolymers of ethylene with alpha-olefins having 3-12 carbon atoms and UHMWPE characterized by an intrinsic viscosity [η] in tetraline at 135° C. of higher than 10.

In some embodiments, the polymerization process is a slurry polymerization using as a diluent an inert hydrocarbon solvent, or a bulk polymerization using a liquid monomer as a reaction medium. In some embodiments, the liquid monomer is propylene. In some embodiments, the polymerization process is a gas-phase process operating in one or more fluidized or mechanically agitated bed reactors. In some embodiments, the slurry polymerization use an inert medium selected from the group consisting of propane, butane, pentane, hexane, heptane and mixtures thereof.

The following examples are given in order to better illustrate the disclosure without limiting it.

EXAMPLES

Characterizations

Determination of Mg, $Ti_{(TOT)}$, Zn and Cu

The determination of Mg, $Ti_{(TOT)}$, Zn and Cu content in the solid catalyst component was carried out via inductively coupled plasma emission spectroscopy on "I.C.P Spectrometer ARL Accuris". The sample was prepared by analytically weighing, in a "Fluxy" platinum crucible", 0.1÷0.3 grams of catalyst and 2 grams of lithium metaborate/tetraborate 1/1 mixture. After addition of some drops of KI solution, the crucible was inserted in a special apparatus "Claisse Fluxy" for the complete burning. The residue was collected with a 5% v/v $HNO_3$ solution and then analyzed via ICP at the following wavelengths: magnesium, 279.08 nm; titanium, 368.52 nm; Zinc, 213.86 nm; copper, 327.40 nm.

Determination of Cl

The determination of Cl content in the solid catalyst component was carried out by potentiometric titration with silver nitrate. In a 250 mL beaker, 5 mL of a sodium hydroxide solution 10% wt./vol. in water and 0.1÷0.3 grams of catalyst were charged. After 20 min stirring at room temperature, 40 mL of a 3.6 M nitric acid solution in water were added and stirring continued for additional 10 min. After dilution with 100 mL of demineralized water, the titration started with a 0.1 N AgNO$_3$ solution in water. At the point of equivalence, the amount of titrant used was calculated and the chlorine amount was quantified.

Determination of Internal Donor Content

The content of internal donor in the solid catalyst component was determined by $^1$H NMR analysis, dissolving the catalyst (about 40 mg) in acetone d$^6$ (about 0.6 ml) in the presence of an internal reference and transferred into a 5 mm (O.D.) NMR tube. The amount of donor present was based on the weight of the catalyst compound.

Determination of Melt Index (MIE, MIF)

The melt indices were measured at 190° C. according to ASTM D-1238, condition "E" (load of 2.16 kg).

Determination of Comonomer Content

1-Butene was determined via $^{13}$C NMR analysis.

$^{13}$C NMR spectra were acquired on a Bruker AV-600 spectrometer equipped with cryo-probe, operating at 150.91 MHz in the Fourier transform mode at 120° C.

The peak of the Sδδ carbon (nomenclature according to C. J. Carman, R. A. Harrington and C. E. Wilkes, Macromolecules, 10, 3, 536 (1977)) was used as internal reference at 29.90 ppm. The samples were dissolved in 1,1,2,2-tetrachloroethane-d2 at 120° C. with an 8% wt/v concentration. Each spectrum was acquired with a 90° pulse, 15 seconds of delay between pulses and CPD to remove $^1$H-$^{13}$C coupling. About 512 transients were stored in 32K data points using a spectral window of 9000 Hz.

Assignments of the spectra were made according to J. C. Randal, Macromol. Chem Phys., C29, 201 (1989).

Triad distribution and composition were made starting from relations between peaks and triads described by Kakugo et al. modified to consider overlaps of signals in the spectra.

Triads
BBB=100 Tββ/S
BBE=100 Tβδ/S
EBE=100 2B2 (EBE)/S
BEB=100 Sββ/S
BEE=100 Sαδ/S
EEE=100 (0.25 Sγδ+0.5 Sδδ)/S
Molar Composition
B=BBB+BBE+EBE
E=EEE+BEE+BEB Determination of Fraction Soluble in Xylene The solubility in xylene at 25° C. was determined according to the following method: 2.5 g of polymer and 250 ml of o-xylene were placed in a round-bottomed flask equipped with a cooler and a reflux condenser and kept under nitrogen. The resulting mixture was heated to 135° C. and kept under stirring for about 60 minutes. The final solution was allowed to cool to 25° C. under continuous stirring, and the insoluble polymer was then filtered. The filtrate was then evaporated in a nitrogen flow at 140° C. to reach a constant weight. The content of the xylene-soluble fraction was expressed as a percentage of the original 2.5 grams.

Determination of Effective Density

Effective density: ASTM-D 1505-10 but referred to MI"E" 1 g/10' as corrected by the following equation: density (MIE=1)=density(measured) −0.0024 ln (MIE)

Procedure for the Preparation of the Solid Catalyst Component

Example 1

Into a 1.0 liter round-bottom flask with breakwaters, purged with nitrogen and equipped with mechanical stirrer, cooler and thermometer, the following components were introduced at room temperature under stirring:

300 mL of toluene,
8.0 grams of magnesium dichloride,
4.1 grams of titanium(III)chloride-aluminum chloride TiCl$_3$*1/3AlCl$_3$ complex,
23.9 mL of n-butanol, and
12.3 mL of THF.

The temperature was raised to 80° C. and maintained for 4 hours. A mixture of 26.4 mL of SiCl$_4$ and 25 mL of toluene was added at 80° C. in 1 h. At the end of addition, the temperature was increased to 85° C. and maintained for 3.5 h. The stirring was discontinued. The solid product was allowed to settle. The supernatant liquid was siphoned off. The solid was washed twice at 85° C. with anhydrous heptane, then once at 40° C. with anhydrous hexane, and then dried under vacuum. A free-flowing powder was obtained and analyzed. The composition of solid catalyst component is reported in Table 1 while Tables 2 and 3 show related performance in copolymerization of ethylene and 1-butene, tests in slurry and in gas phase processes, respectively.

Example 2

The procedure reported in Example 1 was repeated with the difference being that, in addition to the MgCl$_2$ and TiCl$_3$ based compound, solid zinc chloride ZnCl$_2$ was added in step (a) in the amount reported in Table 1.

Examples 3-7

The procedure reported in Example 1 was repeated with the difference being that, in addition to the MgCl$_2$ and TiCl$_3$ based compound, solid copper (II) chloride CuCl$_2$ was added in step (a) in the amount reported in Table 1. Furthermore, in Example 4, SiCl$_4$ was added in a n-butanol/SiCl$_4$ molar ratio of 0.67. In Example 5, the addition of SiCl$_4$ was carried out at 60° C. while in Examples 6-7 the addition of SiCl$_4$ was carried out at 70° C.

Example 8

The procedure reported in Example 1 was repeated with the difference being that, in addition to the MgCl$_2$ and TiCl$_3$ based compound, solid praseodymium (III) chloride PrCl$_3$ was added in step (a) in the amount reported in Table 1.

Example 9

The procedure reported in Example 1 was repeated with the difference being that toluene was replaced with heptane and n-butanol with 1-octanol.

General Procedure for the LLDPE Polymerization Test in Slurry

A 4.5 liter stainless-steel autoclave equipped with a magnetic stirrer, temperature, pressure indicator, and feeding line for ethylene, propane, 1-butene, and hydrogen, and a steel vial for the injection of the catalyst, was purified by fluxing pure nitrogen at 70° C. for 60 minutes. The autoclave was then washed with propane, heated to 75° C. and loaded with 800 grams of propane, 1-butene in the amount reported in Table 2, ethylene (7.0 bar, partial pressure) and hydrogen (1.5 bar, partial pressure). In a separate 100 cm$^3$ round bottom glass flask, 50 cm$^3$ of anhydrous hexane, the cocatalyst mixture solution composed by triethyl aluminum/diethyl aluminum chloride, TEA/DEAC 2/1 weight ratio (8.5 mmol of aluminum), 0.12 g of tetrahydrofuran as external donor, and 0.010÷0.020 grams of the solid catalyst component were introduced. The compounds of the round bottom flask were mixed and stirred at room temperature for 10 minutes. The mixture was then introduced in the reactor through the steel vial by using a nitrogen overpressure. Under continuous stirring, the total pressure was maintained at 75° C., thereby absorbing 150 g of ethylene or for a maximum time of 2 h by continuous ethylene feeding into the system. At the end of the polymerization, the reactor was depressurized and the temperature was reduced to 30° C. The recovered polymer was dried at 70° C. under a nitrogen flow and weighed. Polymer characteristics are reported in Table 2.

General Procedure for the LLDPE Polymerization Test in Gas-Phase

The polymerization was carried out in a 15.0 liter stainless-steel fluidized reactor, equipped with a gas-circulation system, a cyclone separator, a thermal exchanger, a temperature and pressure indicator, and a feeding line for ethylene, propane, 1-butene, and hydrogen. The gas-phase of the reactor was recycled with a velocity that kept the polymeric bed in the reactor in fluidized conditions. The gas phase reactor was controlled at a temperature of 86° C., and a pressure of 21 barg. The gas phase was composed of 25% mol ethylene, 5% mol hydrogen, 1-butene ranging from 10 and 15% mol and propane to reach the final pressure. The solid catalyst component, 0.070-0.150 grams, was precontacted at room temperature for 15 min in hexane slurry, 45 cm$^3$, with trihexyl aluminum (THA), at THA/THF=0.23 molar. A diethyl aluminum chloride (DEAC) solution in hexane was added to the catalyst/THA slurry, at DEAC/THF=0.44 molar. The mixture was contacted for another 15 min at room temperature. Triethyl aluminum (TEA) solution in hexane was added to the slurry, for a final molar ratio Al total/THF=4.1÷4.2. The precontact-slurry was discharged into the gas phase reactor. An ethylene/1-butene mixture (6÷10% wt. of 1-butene) was continuously fed to the reactor, thereby maintaining maintain constant pressure and composition during polymerization. After 90 minutes, the monomer feed was stopped and the polymer bed was discharged into a degassing vessel. The polymer was recovered and additionally degassed under vacuum. Polymer characteristics are reported in Table 3.

TABLE 1 solid catalyst components composition

| Example n. | Mt type | Mt/Mg feed % mol | Mg % wt. | Ti % wt. | Mt % wt. | THF % wt. | Mg/THF m.r. |
|---|---|---|---|---|---|---|---|
| 1 | — | — | 13.7 | 3.2 | — | 33.9 | 1.20 |
| 2 | Zn | 10.0 | 13.8 | 0.6 | 3.7 | 33.2 | 1.23 |
| 3 | Cu | 10.0 | 14.0 | 1.6 | 3.2 | 28.0 | 1.49 |
| 4 | Cu | 10.0 | 14.9 | 0.8 | 3.4 | 33.4 | 1.32 |
| 5 | Cu | 10.0 | 14.0 | 0.9 | 3.0 | 27.3 | 1.53 |
| 6 | Cu | 8.0 | 13.5 | 1.0 | 2.9 | 26.5 | 1.51 |
| 7 | Cu | 5.0 | 12.6 | 3.0 | 1.5 | 27.3 | 1.37 |
| 8 | Pr | 10.0 | 9.8 | 4.7 | n.d. | 23.7 | 1.23 |
| 9 | — | — | 15.3 | 0.7 | — | 31.2 | 1.45 | n.d. = not determined

TABLE 2

LLDPE slurry polymerizations

| Catalyst from Example n. | 1-butene fed g | Mileage Kg/g/h | Xylene soluble % wt. | Density @ MIE = 1 g/cm$^3$ | MIE g/10' |
|---|---|---|---|---|---|
| 1 | 200 | 5.5 | 3.8 | 0.9251 | 0.8 |
| 2 | 180 | 5.2 | 3.8 | 0.9245 | 0.5 |
| 3 | 180 | 4.6 | 2.9 | 0.9263 | 0.6 |
| 4 | 180 | 6.9 | 3.9 | 0.9232 | 1.0 |
| 5 | 160 | 4.0 | 5.6 | 0.9218 | 0.8 |
| 7 | 180 | 9.9 | 7.2 | 0.9189 | 0.6 |
| 8 | 200 | 5.1 | 5.7 | 0.9226 | 1.1 |
| 9 | 180 | 9.2 | 4.5 | 0.9238 | 0.8 |

TABLE 3

LLDPE gas phase polymerizations

| Catalyst from Example n. | Mileage Kg/g | Xylene soluble % wt. | Density @ MIE = 1 g/cm$^3$ | MIE g/10' |
|---|---|---|---|---|
| 1 | 5.9 | 7.0 | 0.9184 | 0.7 |
| 2 | 4.2 | 7.3 | 0.9179 | 0.8 |
| 3 | 2.8 | 5.8 | 0.9179 | 0.6 |
| 4 | 8.5 | 8.4 | 0.9146 | 1.0 |
| 6 | 8.6 | 5.1 | 0.9216 | 0.9 |
| 7 | 9.5 | 4.5 | 0.9211 | 0.6 |
| 8 | 4.7 | 5.7 | 0.9172 | 0.7 |

What is claimed is:

1. A process for the preparation of a solid catalyst component for the homo or copolymerization of olefins $CH_2$=CHR, wherein R is hydrogen or a hydrocarbyl radical with 1-12 carbon atoms, wherein the solid catalyst component comprises Mg, Ti, halogen and an electron donor selected from cycloalkyl ethers, comprising the steps of:
    (a) dissolving, at a temperature,
        a composition comprising
        a Mg based compound of formula ($MgCl_mX_{2-m}$), wherein
        m ranges from 0 to 2,
        X is, independently R1, OR1, —OCOR1 or O—C(O)—OR1 group, wherein R1 is a $C_1$-$C_{20}$ hydrocarbon group, and
        a $TiCl_3$ based compound
        in a liquid inert medium further comprising
        a cycloalkyl ether and
        a compound of formula $R^2OH$, wherein
        $R^2$ is a $C_1$-$C_{20}$ hydrocarbon group,
        wherein
        the Ti/Mg molar ratio ranges from 0.1 to 0.5,
        the cycloalkyl ether/Mg ratio ranges from 1 to 4 and
        the $R^2OH$/Mg molar ratio ranges from 1 to 4,
        thereby yielding a solution; and
    (b) adding, to the solution coming from step (a), $SiCl_4$ in an amount such that the $R^2OH$/$SiCl_4$ molar ratio ranges from 0.5 to 1.5 and maintaining the temperature in the range 50-150° C., thereby precipitating the solid catalyst component in the form of particles.

2. The process of claim 1, wherein the Mg based compound of step (a) is $MgCl_2$.

3. The process of claim 1, wherein the liquid inert medium is selected from aromatic hydrocarbons.

4. The process of claim 1, wherein the cycloalkyl ether has 3-5 carbon atoms.

5. The process of claim 1, wherein $R^2$ is a $C_3$-$C_{15}$ alkyl group.

6. The process of claim 1, wherein the cycloalkyl ether/Mg molar ratio ranges from 1.5 to 3.0 and the Ti/Mg molar ratio ranges from 0.15 to 0.35.

7. The process of claim 1, wherein the step (a) composition further comprises an additional compound of an element of the Lanthanides series or a transition metal belonging to groups 3-12 of the Periodic Table, excluding Ti.

8. The process of claim 7, wherein the additional compound is selected from halides, alcoholates and carboxylates of the elements and metals.

9. The process of claim 7, wherein the additional compound is selected from the group consisting of chlorides of Cu, Zn, Pr, and Nb.

10. The process of claim 7, wherein the additional compound is added to the mixture of step (a) in amount such that its molar ratio with Mg ranges from 0.01 to 0.40.

11. The process of claim 1, wherein in step (a), the temperature is maintained in the range 50-120° C.

12. The process of claim 1, wherein in step (b), $SiCl_4$ is added in an amount such that the $R^2OH/SiCl_4$ molar ratio ranges from 0.6 to 1.3.

13. The process of claim 1, wherein the temperature of step (b) is maintained in the range 60-130° C.

14. A process for the homo or copolymerization of ethylene in which ethylene is polymerized in the presence of a catalyst comprising (1) a solid catalyst component prepared according to claim 1 and (2) an aluminum alkyl compound.

15. The process of claim 14, wherein the catalyst further comprises an external electron donor compound selected from silicon compounds, ethers, esters, amines, heterocyclic compounds, and ketones.

* * * * *

UNITED STATES PATENT AND TRADEMARK OFFICE
CERTIFICATE OF CORRECTION

| | |
|---|---|
| PATENT NO. | : 10,759,882 B2 |
| APPLICATION NO. | : 16/337779 |
| DATED | : September 1, 2020 |
| INVENTOR(S) | : Guidotti et al. |

It is certified that error appears in the above-identified patent and that said Letters Patent is hereby corrected as shown below:

On the Title Page

Column 1, Item (30), Line 1, delete "16191815" and insert -- 16191815.6 --, therefor Signed and Sealed this
Fifteenth Day of November, 2022

Katherine Kelly Vidal
*Director of the United States Patent and Trademark Office*